United States Patent [19]
Sibilia et al.

[11] Patent Number: 5,310,775
[45] Date of Patent: May 10, 1994

[54] NUCLEATING SYSTEM FOR POLY(CHLOROFLUOROETHYLENE) AND ARTICLES FORMED THEREFROM

[75] Inventors: John P. Sibilia, Livingston; Yash P. Khanna, Morris; Anthony J. Signorelli, Succasunna; Dean A. Roberts, Sparta, all of N.J.

[73] Assignee: AlliedSignal Inc., Morristown, N.J.

[21] Appl. No.: 916,552

[22] Filed: Jul. 20, 1992

[51] Int. Cl.$^5$ .......................... C08J 3/20; C08K 5/04; C08K 5/09; C08L 27/18
[52] U.S. Cl. .................................. 524/398; 524/394; 524/395; 524/396; 524/399; 524/425; 524/445; 524/447; 524/451
[58] Field of Search ............... 524/425, 445, 447, 451, 524/394, 395, 396, 398, 399

[56] References Cited

U.S. PATENT DOCUMENTS

| | | | |
|---|---|---|---|
| 4,749,736 | 6/1988 | Khanna et al. | 524/230 |
| 5,122,592 | 6/1992 | Khanna et al. | 528/481 |

*Primary Examiner*—Paul R. Michl
*Assistant Examiner*—U. K. Rajguru
*Attorney, Agent, or Firm*—Darryl L. Webster; Richard C. Stewart; Gerhard H. Fuchs

[57] ABSTRACT

This invention relates to a composition comprising (a) at least one polymer selected from the group consisting of poly(chlorotrifluoroethylene) and copolymers of chlorotrifluoroethylene and one or more ethylenic co-monomers; wherein said copolymers comprise at least about 50% by weight of chlorotrifluoroethylene and (b) effective amount of one or more nucleating agents selected from the group of compounds consisting of silver octonate, calcium carbonate, potassium benzoate, talc and lays bentonite, montmorillonite, hectorite and derivatives thereof.

24 Claims, 2 Drawing Sheets

Optical Photomicrograph of Poly (CTFE) Crystallized from the Molten State at a Cooling Rate of 0.6°C/min.

Optical Photomicrograph of Poly (CTFE) Crystallized from the Molten State at a Cooling Rate of 0.6°C/min.

Optical Photomicrograph of Poly (CTFE) Containing 1% Talc Crystallized from the Molten State at a Cooling Rate of 0.6°C/min.

NUCLEATING SYSTEM FOR POLY(CHLOROFLUOROETHYLENE) AND ARTICLES FORMED THEREFROM

BACKGROUND OF THE INVENTION

1. Field of the Invention

This invention relates to novel nucleating agents for poly(chlorotrifluoroethylene), and related polymers. This invention relates to the polymer based compositions containing the nucleating agents as well as the articles of manufacture formed totally or in part from the polymer based composition of this invention.

2. Description of the Prior Art

The "super" or morphological structure in which the crystalline units are arranged, affects the physical properties of polymers. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from polymers, it is desirable, therefore, to produce a highly crystalline material, crystallized with an extremely fine, dense and uniform morphological structure.

Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Nucleation by foreign materials has been extensively studied, especially in the case of polypropylene. For example, H. N. Beck or H. D. Led better, *J. Appl. Polym. Sci.* 9, 2131 (1965) and H. N. Beck, *J. Appl Polym. Sci.* 11, 673 (1987) checked the nucleation activity of more than two hundred substances by determining the temperature, Tcc, at which the crystallization rate on cooling is the fastest. F. L. Binsbergen, *Polymer*, 11, 253 (1970) extended these studies in testing two thousand substances for nucleating activity in polyethylene, polypropylene, poly(4-methyl-1-pentene) and poly(styrene). Other working nucleating agents for polyolefin are described by J. P. Mercier, *Polymer Engineering and Science*, 30, 270 (1990), Wijga, P. W. O. U.S. Pat. No. 3,207,735; -6; -8(1960) Wijga, P. W. O. and Binsbergen, F. L. U.S. Pat. No. 3,299,029(1961) Wales, M. U.S. Pat. No. 3,207,737; -(1961-62) Binsbergen, F. L. U.S. Pat. Nos. 3,326,880; 3,327,020; -1(1963) Kargin, V. A. et al, *Dokl. Akad. Nauk.* SSSR 1964, 156, 1156(transl.: Dokl. Phys. Chem. 1964, 156, 621, 644) Doring, C. and Schmidt, H. German Pat.(Federal Rep.) 1,188,279(1963) and Vonk, G. C. Kolloid Z. 1965, 206, 121.

The function of nucleating agents when cooling semi-crystalline polymers from the molten state into the solid form is to increase the number of nuclei formed in a given time interval at a predetermined temperature. The final and overall crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polymer, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 72° C. in poly(chlorotrifluoroethylene).

At present there are no commercially known nucleating agents for poly(chlorotrifluoroethylene). As with other polymers having nucleating agents dispersed therein, the nucleated polymer compositions of this invention should exhibit enhanced properties, such as improved transparency, surface gloss, impact strength, as well as decreased void formation in the molded articles formed from the polymer compositions and shortened processing cycles.

SUMMARY OF THE INVENTION

Presently, it has been discovered that the crystallization temperature ($T_{cc}$) of poly(chlorotrifluoroethylene) and copolymers of chlorotrifluoroethylene can be increased by the addition of an effective amount of one or more effective nucleating agents selected from the group consisting of compounds such as silver octonate, calcium carbonate, potassium benzoate talc and clays such as bentonite, montmorillonite, hectorite and derivatives thereof. The crystallization temperature upon cooling reflects the overall crystallization rate due to the combined effects of nucleation and growth of crystallites/spherulites. A non-nucleated polymer would have a lower $T_{cc}$ than a nucleated material, and a polymer crystallizing at a lower rate would have a lower $T_{cc}$ than a faster crystallizing polymer. It is believed that an increase in $T_{cc}$ and the corresponding increase in the crystallization rate indicate an improvement in the thermal, optical and/or mechanical properties of the polymer. See "Memory Effects in Polymers II. Processing History vs. Crystallization Rate of Nylon 6-Observation of Phenomenon and Product Behavior", Y. P. Khanna et al. in *Polymer Engineering and Science*, 24, Vol. 28, pp. 1600-1606, December, 1988, and also "Memory Effects in Polymers III", Y. P. Khanna et al. in *Polymer Engineering and Science*, 24, Vol. 28, pp. 1607-1611, December 1988, for additional information regarding the effects of increasing the $T_{cc}$ of a polymer.

The composition of this invention comprises (a) at least one polymer selected from the group consisting of poly(chlorotrifluoroethylene) and copolymers of chlorotrifluoroethylene and one or more ethylenic comonomers; wherein said copolymers comprise at least about 50% by weight of chlorotrifluoroethylene and (b) effective amount of one or more nucleating agents.

Yet another aspect of this invention relates to a novel process for enhancing the rate of crystallization of a poly(chlorofluoroethylene) or related copolymer from the melt, which comprises adding to said polymer or copolymer a crystallization enhancing effective amount of the nucleating agent of this invention.

Several advantages flow from this invention. For example, by speeding up the rate of crystallization, processing times are decreased.

BRIEF DESCRIPTION OF THE DRAWINGS

The invention will be more fully understood and further advantages will become apparent when reference is made in the following detailed description of the invention and the accompanying drawings in which.

DESCRIPTION OF THE EMBODIMENTS OF THE INVENTION

Figure 1:
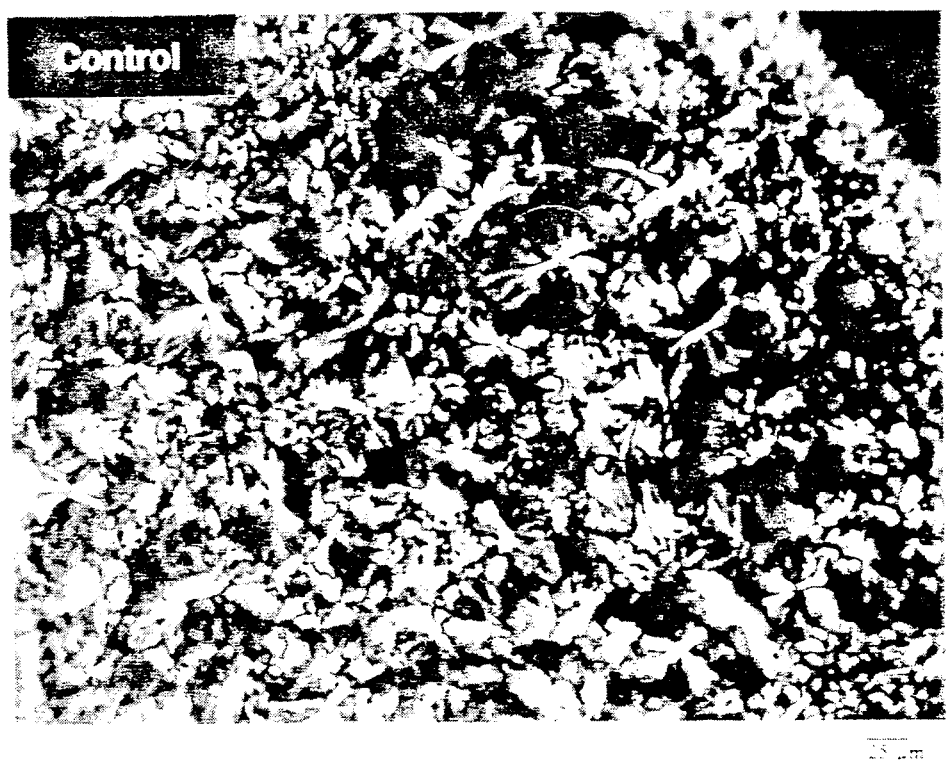
FIG. 1 is an optical photomicrograph of poly(CTFE) which does not contain a nucleating agent crystallized in a differential scanning calorimeter at 0.62° C./min.

As an essential ingredient, the composition of this invention comprises one or more polymers selected from poly(chlorotrifluoroethylene) and copolymers of chlorotrifluoroethylene and one or more comonomers. The comonomers are ethylenic monomeric units, such as olefins and also include vinyl halides (e.g. vinyl fluoride) and halogenated olefins, such as trifluoro ethylene and vinylidene fluoride. The copolymers of this invention comprise at least about 75% by weight of chlorotrifluoroethylene. Preferably, the copolymer comprise at least about 85% of chlorotrifluoroethylene and, more preferably, at least about 90%. At further preferred embodiments, the copolymer comprised at least about 95% chlorotrifluoro ethylene with a copolymer of at least 98% chlorotrifluoroethylene being the most preferred.

Illustrative of monomers for use as comonomers with chlorotrifluoroethylene include one or more of: ethylene, propylene, isobutylene, vinylfluoride, hexafluoropropylene, tetrafluoroethylene, vinylidene fluoride, perfluoro vinylether, acrylic acid and alkylesters, methacrylic acid and perfluoroalkylene (2-8 carbons), etc. Ethylene, vinylfluoride and trifluoroethylene are preferred monomers with vinyl fluoride and trifluoroethylene being particularly preferred comonomers. Copolymers may be prepared by processes known to those skilled in the art. U.S. Pat. No. 2,392,378 shows copolymerization of ethylenic monomers such as ethylene with chlorotrifluoroethylene. The above poly(CTFE) and copolymers of CTFE are herein referred to collectively as poly(CTFE). One of the sources for CTFE homopolymer & copolymers above is Allied-Signal Inc.

The molecular weight of the poly(CTFE) may vary widely, for example, the poly(CTFE) may be a wax having relatively low molecular weight, i.e. about 500 to 1000 or more. The poly(CTFE) may also be a meltspinnable and of a fiber-forming molecular weight. In other embodiments, the poly(CTFE) has film-forming molecular weight. Usually the film-forming poly(CTFE) has a molecular weight of at least about 5000. In preferred embodiments of the invention, the molecular weight of the poly(CTFE) is from about 8000 to about 1,000,000 and in particularly preferred embodiments is from about 25,000 to about 750,000. Amongst the particular preferred embodiments, the most preferred are those in which the molecular weight of the poly(CTFE) is from about 100,000 to about 600,000.

A second essential component of the composition of this invention will include an effective amount of an effective nucleating agent. Effective nucleating agent simply in practice of this invention are selected from one or more of the group consisting of compounds such as silver octonate, calcium carbonate, potassium benzoate talc and clays such as bentonite, montmorillonite, hectorite and derivatives thereof. For the clays, organic derivatives are those clays which have been treated with organic protonated amines or quaternary ammonium cations. The above clays may also be treated with organo silanes. The silane treated clays are more preferred as nucleating agents for practice of this invention although it is noted that the above organo treated clays may have a tendency to discolor the polymer in commercial preparations (the discoloration may be reflective of degradation of the polymer to some extent). Montmorillonite and hectorite are particularly preferred nuclecting agents. Those clays which contain magnesium, e.g. hectorite are more particularly preferred. In further preferred embodiments, the nucleating agent is selected from potassium benzoate or talc, with the most preferred being talc.

The amount of nucleating agent added to the poly(CTFE) is an "effective amount". As used herein, an "effective amount" is an amount which is sufficient to improve the homogeneity and/or fineness of spherulitic structures in the poly(CTFE) to any extent. Such amounts will normally correspond to amounts of conventional nucleating agents. In the preferred embodiments of the invention, the amount of nucleating agent employed is in the range of from about 0.001 to about 5 weight percent based on the total weight of poly(CTFE) and agent, and in the particularly preferred embodiments of the invention is from about 0.05 to about 3 weight percent on the aforementioned basis. Amongst these particularly preferred embodiments, most preferred are those embodiments where the amount of nucleating agent employed is from about 0.1 to about 2.0 weight percent based on the total weight of agent and poly(CTFE). The nucleating agent is uniformly dispersed in the poly(CTFE).

In preferred embodiments of the invention, the nucleating agents possess a particle size of about 200 $\mu$m or less. Preferably, the nucleating agents is at least about 0.05 $\mu$m, and more preferably, the particle size of the nucleating agent is about 0.25 $\mu$m to about 150. In particularly preferred embodiments, the particle size is from about 0.25 to about 100 $\mu$m with from about 0.5 to 60 $\mu$m the size of choice.

Since the compositions of this invention are useful in forming molded articles, in addition to the above-described essential components, compositions cf this invention can include various optional components which are additives commonly employed with the polymers and copolymers of this invention. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

A filler can be added to increase the modulus and stiffness of the composition, and provide a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, carbon black, glass quartz, novaculite and other forms of silica, kaolinite, garnet, mica, saponite, beidellite, calcium hydroxide, and the like. Such fillers are well known materials and are readily available. The foregoing recited fillers are illustrative only and are not meant to limit the scope of the fillers that can be employed in this invention. Fibrous materials such as fiber glass, carbon fibers, boron fibers and polymer fibers are the fillers of choice, and the glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of from about 30 to about 90 weight percent on the same basis.

While not essential, it may be desirable to include an optional plasticizer in the composition of this invention. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in linear polyolefin molding compositions. Such useful plasticizer compositions are well known in the art and accordingly will not be described herein in detail.

The composition of this invention can be further modified by the addition of one or more pigments. Illustrative of useful pigments are iron oxide, cadmium red, rhodamine, chrome yellow, chrome green, and phthalocyanine blue.

The composition of this invention can be prepared by blending or mixing the essential ingredients, and other optional components, as uniformly as possible employing any conventional blending means. Appropriate blending means, such as melt extrusion, batch melting and the like, are well known in the art and will not be described here in greater detail. In one useful procedure, the blending procedure can be carried out at elevated temperatures above the melting point of the polymer and the nucleating agent added either alone or as individual components of the agent separately or as a combination of the components in a suitable form as for example, granules, pellets and preferably powders are added to the melt with vigorous stirring. Alternatively, all or a portion of the various components of the nucleating agent can be masterbatched or preblended with the polymer in the melt and this premixed or masterbatch added to the polyolefin in the melt in amounts sufficient to provide the desired amount of nucleating agent in the polyolefin product. Stirring is continued until a homogeneous composition is formed. The nucleating agent can also be added to the melt coated on the surface of small particle inert powders which have a high surface to volume ratios. The use of such inert powders, as for example, fused silica, fused alumina, carbon black and aerogels, and hydrogels of silica or alumina, helps to reduce the amount of nucleating agent required to provide optimum results. Blending pressures, and the order of addition of the various components are not critical and may be varied as desired provided that a substantially homogeneous composition results. The blending procedure can be carried out at elevated temperatures, in which case the polymer component is melted and the solid nucleating agent is admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

Alternatively, the composition of this invention can be formulated by dissolving the components in an appropriate inert solvent, after which the solvent is removed by evaporation, or other conventional solvent removing means are employed to provide the composition. The solvent is not critical, the only requirement being that it is inert to the components of the composition, and it is capable of solubilizing the various components, or at least forming dispersions thereof.

The compositions according to the invention can be partially crystalline to amorphous, depending on which individual constituents are employed. They are thermoplastic materials from which molded articles of manufacture having valuable properties can be produced by the conventional shaping processes, such as melt spinning, casting, injection molding and extruding. Examples of such moldings are components for technical equipment, apparatus casting, household equipment, sports equipment, components for the electrical and electronics industries and electrical insulations, car components, circuits, fibers, films, piping, gaskets, tank linings, connectors, valve diaphragms, and semi-finished products which can be shaped by machining. The molding compositions according to the invention are outstandingly suitable for specific applications of all types since their spectrum of properties can be modified in the desired direction in many ways.

The compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example, based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films. The compositions of this invention are especially useful for fabrication of extruded films, as for example films for use in food packaging.

Several examples are set forth below to illustrate the nature of the invention and a manner of carrying it out. However, the invention should not be considered as being limited to the details thereof.

EXAMPLES

Procedure for Measurement of Tcc

The experiments were carried out to show the superior crystallization characteristics of the composition of this invention as compared to other nucleated poly(CTFE) compositions and un-nucleated compositions as determined by differential scanning colorimetry (DSC) experiments.

The DSC experiments were carrier out using a DuPont 9900 automated system, in an argon atmosphere. A sample of 10.0±0.2 mg was crimped in an aluminum cup, heated to 280° C. at a program rate of 10° C./min, held there for 5 min. and then cooled at 10° C./min to obtain the Tcc (the crystallization temperature).

EXAMPLE I

About 250 mg of powder polychlorotrifluoroethylene (CTFE≃99.3%) was mixed with 1.25 mg (0.5%) of the additive and the mixture refluxed in 10 ml of o-chlorobenzotrifluoride (solvent) at 145° C. for 4 hours while stirring magnetically. Precipitation was carried out by introducing water (non-solvent) while stirring. The precipitate was first dried on a steam bath and then under vacuum at 100° C. overnight. A control sample was also made for comparison.

The attached data reveals that talc leads to the highest $T_{cc}$ as compared to cadmium oxide and molybdenum sulfide described in the prior art; the higher the $T_{cc}$, the more the effectiveness of the nucleating agent. It should also be noted that the cadmium and molybdenum salts impart undesirable color to the polymer and suffer from the toxicity problems.

| Additive (0.5%) | $T_{cc}$, °C. @ 10° C./min. | Comments Color | Toxic |
|---|---|---|---|
| None | 166 | white | no |
|  | 167 |  |  |
| Boron | 165 | grey | yes |
| Molybdenum Sulfide | 168 | black | yes |
|  | 167 |  |  |
| Cadmium Oxide | 169 | pink | yes |
|  | 170 |  |  |
| Talc (1.5 μm) | 173 | white | no |
|  | 173 |  |  |

EXAMPLE II

In addition to the 4 compounds listed in Example I, 16 more compounds were evaluated with respect to their nucleating action. In this case, a cooling rate of 40° C./min. was used as opposed to the 10° C./min., which can better discriminate the various potential candidate additives (see "A Barometer of Crystallization Rates of Polymeric Materials", Y. P. Khanna in *Polymer Engineering and Science*, Vol. 30, No. 24, pp. 1615-1619, December 1990).

About 400 mg of a powder polychlorotrifluoroethylene (CTFE≃98%) was mixed with 8 mg (2%) of the additive and shaken for 2 min. in a vessel equipped with a stainless steel ball. Then the mixture was pressed into a thin disc in a conventional IR press under a pressure of 10 tons for 10 seconds. This disc was powdered, pressed again, and then compression molded into a thin film at 240° C. in order to enhance the dispersion. A control film was similarly made for comparison. Once again, talc (1 μm average particle diameter) is identified as the most effective nucleator for poly(CTFE).

| Additive Type | $T_{cc}$, °C. @ 40° C./min. Data Points | Average |
|---|---|---|
| None | 147.3 | 147.7 (±1.4) |
|  | 149.4 |  |
|  | 148.8 |  |
|  | 147.5 |  |
|  | 145.7 |  |
| Zinc oxide | 148.5 | 150.6 (±2.1) |
| Calcium perfluorooctonate | 151.7 | 151.7 |
| Magnesium oxide | 154.0 | 154.0 |
| Lithium chloride | 154.7 | 154.7 |
| Montmorillonite[a] | 155.0 | 155.0 |
| Calcium oxide | 155.0 | 155.0 |
| Silver perfluorooctonate | 155.6 | 155.6 |
| Montmorillonite[b] | 156.7 | 156.7 |
| Montmorillonite[c] | 157.1 | 157.1 |
| Bentone 38 Modified[d] | 157.2 | 157.2 |
| Calcium carbonate | 157.5 | 157.5 |
| Montmorillonite[e] | 159.0 | 159.0 |
| Bentone 38[f] | 159.4 | 159.4 |
| Hectorite[g] | 159.5 | 159.5 |
| Talc (40 μm) | 161.8 | 161.8 |
|  | 161.8 |  |
| Talc (3 μm) | 161.8 | 161.6 (±0.2) |
|  | 161.4 |  |
| Talc (1 μm) | 162.4 | 163.9 (±1.3) |
|  | 165.0 |  |
|  | 164.3 |  |

[a]Intercalated with protonated 11-aminoundecanoic acid.
[b]Intercalated with octadecylsilane.
[c]Unmodified, layered aluminosilicate intercalated with cations such $Na^+$, $Ca^{+2}$, $Al^{+3}$.
[d]Bentone 38 treated with caprolactam isocyanatopropyl (trimethoxy) silane.
[e]Intercalated with protonated octadecylamine.
[f]Hectorite intercalated with dimethyl dioctadecylammonium cation.
[g]Layered magnesium aluminosilicate.

EXAMPLE III

About 20 gm of a powder polychlortrifluoroethylene (CTFE≃98%) was mixed with 200 mg (1%) of talc and the mixture compression molded at 240° C. into a plaque of about 1.25 mm. A small piece from this plaque was remolded into a thin film about 5 mils. for DSC/microscopy examination.

Figure 2:
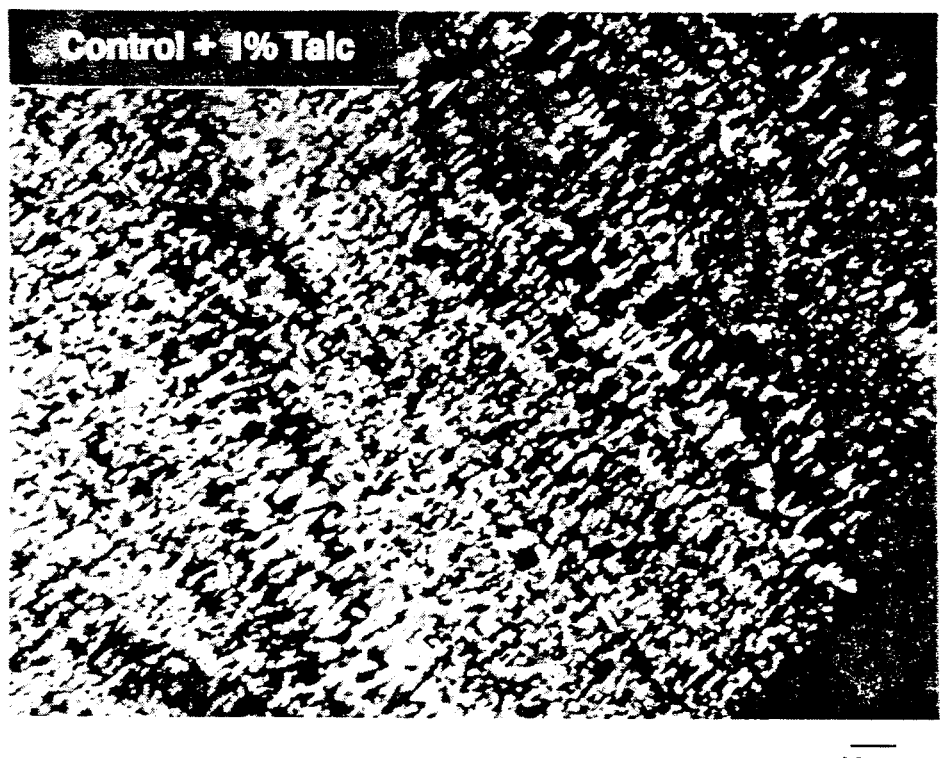
FIG. 2 is an optical photomicrograph of poly(CTFE) which contains 1% talc crystallized in a differential scanning calorimeter at 0.62° C./min.

Films with and without 1% talc were cooled in the DSC unit at a rate of 0.62° C./min. and the optical photomicrographs (See FIGS. 1 and 2) of the cross-sections taken in polarized light. A much finer grainy structure for the talc containing film as opposed to the large spherulites for the control film is in line with the nucleating potential of talc for poly(CTFE).

EXAMPLE IV

A comparative example was conducted for the use of sodium benzoate and potassium benzoate. Procedures and preparation of Example II were followed. The data revealed the superior nucleating property of the latter for poly(CTFE).

| Additive Type | $T_{cc}$, °C. @ 40° C./min. Data Points | Average |
|---|---|---|
| None | 148.4 | 149.2 (±1.5) |
|  | 148.3 |  |
|  | 150.9 |  |
| Na Benzoate | 158.4 | 158.4 (±0.0) |
|  | 158.4 |  |
| K Benzoate | 161.0 | 160.5 (±1.1) |
|  | 159.8 |  |
|  | 159.0 |  |
|  | 160.8 |  |

-continued

| Additive Type | T$_{cc}$ °C. @ 40° C./min. | |
|---|---|---|
| | Data Points | Average |
| | | 161.7 |

It is noted with respect to the variance in Tcc values for the controls that the resin used in Examples II, III and IV were from the same lot number. Example I used a resin from a different lot. In Example II and IV, the differences in Tcc values for controls reflect possible differences either due to sample history or may be attributed to powder inhomogeneity.

What is claimed is:

1. A composition comprising (a) at least one polymer selected from the group consisting of poly(chlorotrifluoroethylene) and copolymers of chlorotrifluoroethylene and one or more ethylenic comonomers; wherein said copolymers comprise at least about 50% by weight of chlorotrifluoroethylene and (b) effective amount of one or more nucleating agents selected from the group of compounds consisting of silver octonate, calcium carbonate, potassium benzoate, talc and lays bentonite, montmorillonite, hectorite and derivatives thereof.

2. A process for enhancing the rate of crystallization of a polymer selected from the group consisting of poly(chlorotrifluoroethylene) and copolymers of chlorotrifluoroethylene and one or more ethylenic comonomers; wherein said copolymers comprise at least about 50% by weight of chlorotrifluoroethylene from the melt, which comprises adding to said poly(chlorotrifluoroethylene) a crystallization enhancing effective amount of one or more nucleating agents selected from the group of compounds consisting of silver octonate, calcium carbonate, potassium benzoate, talc clays selected from bentonite, montmorillonite, hectorite and derivatives thereof.

3. The composition of claim 1 wherein the nucleating agent is a clay which has been treated with one or more protonating agent.

4. The composition of claim 1 wherein the nucleating agent is a clay which has been treated with one or more organic protonating agents.

5. The composition of claim 1 wherein the nucleating agent is a clay which has been treated with one or more organic protonating amines or quaternary salts.

6. The composition of claim 1 wherein the nucleating agent is a clay which has been treated with one or more silanes.

7. The composition of claim 1 wherein the nucleating agent is selected from montmorillonite and hectorite.

8. The composition of claim 1 wherein the nucleating agent is selected from clays which contain magnesium.

9. The composition of claim 1 wherein the nucleating agent is hectorite, potassium benzoate or talc.

10. The composition of claim 1 wherein the nucleating agent is hectorite.

11. The composition of claim 1 wherein the nucleating agent is potassium benzoate.

12. The composition of claim 1 wherein the nucleating agent is talc.

13. The composition of claim 1 wherein said copolymers comprise at least about 75% by weight of chlorotrifluoroethylene.

14. The composition of claim 1 wherein said copolymers comprise at least about 85% by weight of chlorotrifluoroethylene.

15. The composition of claim 1 wherein said copolymers comprise at least about 90% by weight of chlorotrifluoroethylene.

16. The composition of claim 1 wherein said amount of nucleating agent or agents is about 0.001 to about 5 weight percent based on the total weight of the polymer.

17. A composition comprising (a) at least one polymer selected from the group consisting of poly(chlorotrifluoroethylene) and copolymers of chlorotrifluoroethylene and one or more ethylenic comonomers; wherein said copolymers comprise at least about 50% by weight of chlorotrifluoroethylene and (b) one or more compounds selected from the group of compounds consisting of silver octonate, calcium carbonate, potassium benzoate, talc, bentonite, montmorillonite, hectorite and derivatives thereof; wherein sum of weight percent of the compounds of (b) is about 0.001 to about 5 percent based on the total weight percent of the polymer or copolymer.

18. The composition of claim 1 wherein the nucleating agent has a particle size of less than about 200 μm.

19. The composition of claim 1 wherein the nucleating agent has a particle size ranging from at least about 0.25 μm to about 150 μm.

20. The composition of claim 1 wherein the nucleating agent has a particle size ranging from at least about 0.25 μm to about 100 μm.

21. The composition of claim 1 wherein the nucleating agent has a particle size ranging from at least about 0.5 μm to about 60 μm.

22. The composition of claim 12 wherein the nucleating agent has a particle size of at least about 0.5 μm to about 60 μm.

23. The composition of claim 12 wherein the nucleating agent has a particle size of at least about 0.5 μm to about 40 μm.

24. The composition of claim 12 wherein the nucleating agent has a particle size of at least about 0.5 μm to about 30 μm.

* * * * *